Oct. 20, 1970     H. ROBRA     3,534,579
STEPWISE FORGING MULTITHROW CRANKSHAFTS
Filed Aug. 21, 1968
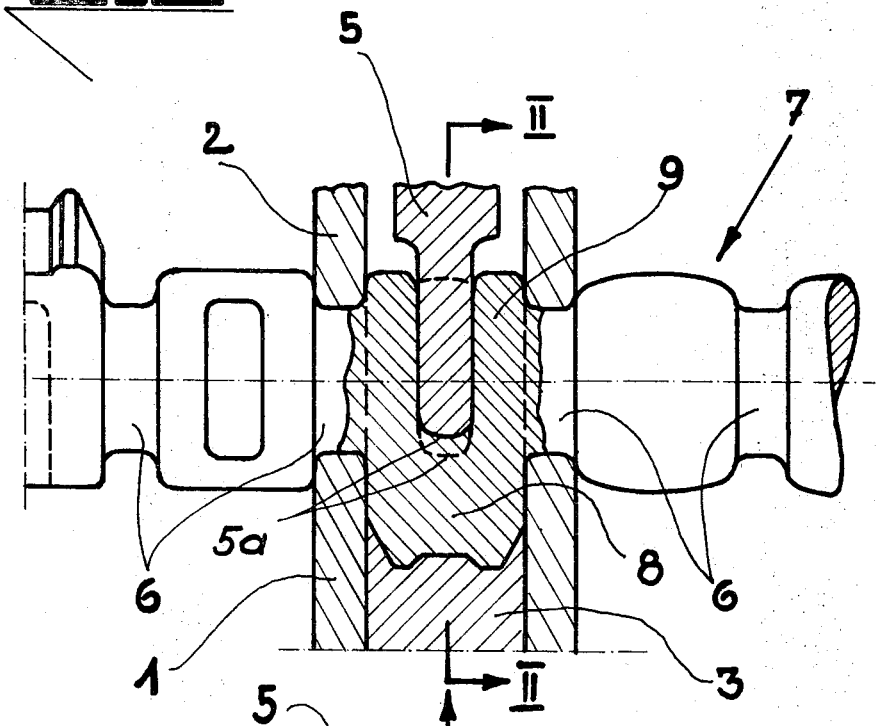
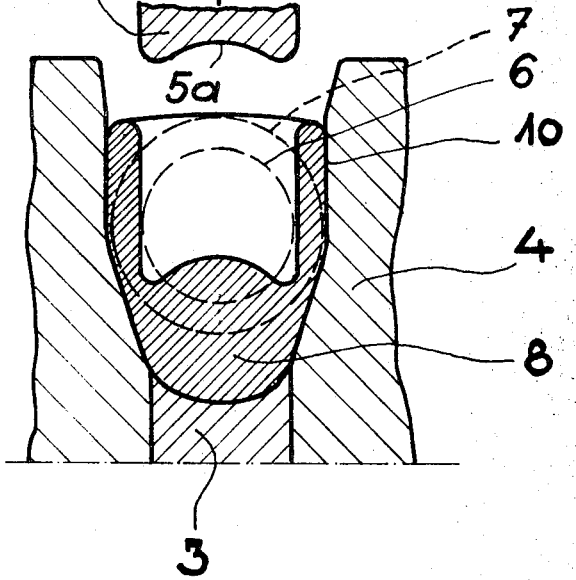
INVENTOR.
HELMUT ROBRA.
BY *Hascock, Downing & Seibold*
ATTORNEYS

United States Patent Office 3,534,579
Patented Oct. 20, 1970

3,534,579
STEPWISE FORGING OF MULTITHROW CRANKSHAFTS
Helmut Robra, Mulheim an der Ruhr, Germany, assignor to Schloemann Aktiengesellschaft, Dusseldorf, Germany, a company of Germany
Filed Aug. 21, 1968, Ser. No. 754,244
Claims priority, application Germany, Sept. 14, 1967, Sch 41,306
Int. Cl. B21k 1/08
U.S. Cl. 72—377                 2 Claims

ABSTRACT OF THE DISCLOSURE

A method for the stepwise forging of a multithrow crankshaft from a round blank with pressed-in bearing positions, in which a thickening between two such bearing positions is pressed through on to a support and is then pressed down into the shape of a journal of the length of the required crankpin, the pressing being effected with a ram the breadth of which is less than the diameter of the said thickening, and the support being a die of such form that the displaced material of the blank is shaped into a crankpin and crank webs and bridge-pieces connecting the crank webs with one another.

---

This invention relates to a method for the stepwise forging of multithrow crankshafts from a round blank with pressed-in bearings, in which a thickening located between two clamped-in bearings is pushed through onto a support, and is then pressed down into journal form in the length of the crankpin to be produced, the material being displaced into the crank webs.

In forging the crank webs of a crankshaft it is necessary to turn the crankshaft over, that is to say, to lift it out of the die or swage by means of a crane and of an ejector or the like working from beneath, or both, and to re-insert it in a fresh position. In so doing it may happen that the finished crankpin becomes bent, in which case the distance between the crank webs in the region of the axis of the shaft is reduced, and in this way the crankshaft becomes curved.

In order to counteract the bending of the crankshaft when taking the crank throw out of the die, it is known from German (Federal) Pat. No. 870,932, page 3, line 33, to interpose a packing-piece in the pressed-in crank throw between the crank webs. Since the individual cranks are as a rule forged when set at 90° or 180° to another, and the crankshaft blank, during the turning-over of the crankshaft, has to be further rotated through a corresponding angle, the inserted packing-pieces must also be secured against dropping out. When the crankshaft has been finish-forged, it is placed in a sand bed for cooling. The individual packing-pieces must however first be removed from the crank throws, after releasing the securing means, since otherwise the shrinkage incidental to the cooling of the crankshaft would be hindered, and the packing-piece would become tightly jammed in the crank throws.

In conjunction with the cooling it is furthermore usual for the crankshaft to be tempered to a definite strength, packing-pieces being as a rule inserted afresh, and being connected with the crank webs by short welded seams, in order to prevent too great a distortion of the individual crank throws. These packing-pieces then have to be removed again after the improving or tempering treatment, before a commencement can be made with the machining, involving removing shavings from the journals and bearing surfaces in the workshop.

From what has been stated it will be clear that this working with packing-pieces is complicated, and takes up a great deal of time. This loss of time is just what is such a disadvantage in forging a crankshaft, particularly a multithrow crankshaft, because the individual crank throws are to be forged not merely in a single heat, but also at a temperature which as far as possible is the same for all the crank throws, which is not possible when working with packing-pieces. Whilst at present the number of crank throws in ships' propeller shafts still lies in the range of about nine to twelve, the course of development already tends towards greater numbers of cylinders, so that working with packing-pieces, owing to the loss of time, constitutes an ever-increasing problem, and, on account of the increase in crankshaft length, it is also becoming increasingly difficult to guard against the bending of the crankshafts.

With a view to obviating the disadvantages enumerated, and having regard to the expected increase in the number of crankshaft throws, this invention has faced the problem, in the stepwise forging of multithrow crankshafts, of increasing the rigidity of the forged crank throws, whilst saving the packing-pieces, and also of shortening the time occupied by the forging.

This aim is attained, according to the invention, in the method mentioned above, by forcing the crank throw through with a ram, which, as compared with the diameter of the thickening, is of less breadth, with, at the same time, laterally bounded concentration of material into bridge-pieces connecting the crank webs with one another.

The crank throws forged in this way possess about the same advantageous distribution of fibers as the crank throws forged by other known processes. The bridge-pieces remaining standing or pressed upward laterally, beside the ram, may remain, until after the tempering, as a connection between the crank webs, and may then be removed by means of a cutting torch or the like. By this means of a cutting torch or the like. By this means also it is possible, in tempering or improving, to obviate any distortion of the crankshaft without employing packing-pieces, which constitute a further advantage of the invention.

In view of the fact that the finish-forged crankshaft blank, after the improving, whilst the bearing and journal-bearing surfaces are being turned, is to experience as little removal of material as possible, whilst on the other hand the remaining bridge-pieces, for the attainment of a sufficient rigidity of the forged crankshaft, must still exhibit an adequate wall thickness, it is particularly desirable, in a further development of the invention, for the pushing through of the crank throw to be effected with a breadth corresponding to the rough diameter of the journals, and in a form adapted to the curvature of the surface of the journals.

The method according to the invention is described hereunder with reference to the accompanying drawings, in which:

FIG. 1 shows a diagrammatic section through the clamping saddles, with the part of the shaft located between them partially finish-forged, and with the press ram lowered; and FIG. 2 shows a diagrammatic section on the line II—II in FIG. 1, with the press ram raised.

In FIG. 1 a partially finish-forged crankshaft 7, with its rolled-in bearing 6, is held between clamping saddles or holding bearings 1 and 2. To the left of the clamping saddles 1 and 2 there are the already finish-forged crank throws of the crankshaft, angularly displaced from one another through 90°, whilst upon the right-hand side of the clamping saddles 1 and 2 of the crankshaft blank 7, between the bearings 6, there are still unforged thickenings. The part of the crankshaft blank 7 located between the clamping saddles 1 and 2 is being forged from a round thickening to a crank throw by means of a press ram 5, against an under die or swage 3, which is bounded laterally by the clamping saddles 1 and 2, as well as by the swage bars 4 shown in FIG. 2. The ram 5 employed in the method according to the invention is of rectangular cross-section in its lower region, which penetrates into the thickening, the thickness of the ram corresponding to the rough journal length. The breadth of the ram is less than the diameter of the thickening of the crank blank, but is preferably at least as great as the diameter of the rough crankshaft journal 8. The pressing surface 5a of the ram 5 is here adapted as far as possible to the curvature of the surface of the journal, so as to require as little removal of material as possible when finish-turning the journal blank.

The round thickening of the crankshaft blank is forged to the crank throw in a die or swage which is closed at the sides and underneath but is open above, the distance between the swage bars 4 being equal to the diameter of the thickening. On the basis of the breadth of the pressing ram 5 being less than diameter of the thickening, the material to be shaped during the decent of the press ram 5 simultaneously with the pushing upwards of part of it into the crank webs 9, is forced into the gap between the swage bars 4 and the press ram 5, so that the crank webs 9 remain connected with one another by two bridge-pieces 10. These bridge-pieces 10 impart to the finish-forged crankshaft the strength and rigidity aimed at by the invention, so that any bending or curving of the crankshaft upon being lifted out of the swage and upon being thereupon turned round and turned over before the forging of the next crank throw, is avoided.

The bride-pieces 10 connecting the crank webs 9 with one another must then be removed by means of a cutting torch or the like before the shaving-removing finish-treatment of the bearing and journal surfaces, which may perhaps also be effected in the usual manner following the tempering operation carried out in conjunction with the forging.

I claim:
1. A method for the stepwise forging of a multithrow crankshaft from a round blank with pressed-in bearing positions and with a thickening located between two pressed-in bearing positions, comprising the steps of: supporting the crankshaft blanks with its pressed-in bearing positions resting upon bearings, forcing the shaft material between the bearing positions downwards, by means of a ram the breadth of which is less than the diameter of the thickening, into a die of such a form that the material of the blank thus displaced is shaped into a crankpin and crank webs, and bridge-pieces connecting the crank webs with one another.

2. A method for the stepwise forging of multithrow crankshafts as claimed in claim 1, the displacement of the material of the blank being effected over a breadth corresponding to the rough diameter of the required crankpin, and the die being adapted in shape to the required curvature of the crankpin surface.

References Cited

UNITED STATES PATENTS

| 2,911,705 | 11/1959 | Vom Bovert | 29—6 |
| 3,129,488 | 4/1964 | Robra et al. | 29—6 |

LOWELL A. LARSON, Primary Examiner

U.S. Cl. X.R.

29—6